United States Patent
Yamane et al.

(10) Patent No.: US 7,821,165 B2
(45) Date of Patent: Oct. 26, 2010

(54) MOTOR AND METHOD OF MANUFACTURING STATOR USED THEREFOR

(75) Inventors: Mitsuru Yamane, Osaka (JP); Manabu Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/573,988

(22) PCT Filed: Jul. 11, 2006

(86) PCT No.: PCT/JP2006/313729
§ 371 (c)(1),
(2), (4) Date: Feb. 20, 2007

(87) PCT Pub. No.: WO2007/052385
PCT Pub. Date: May 10, 2007

(65) Prior Publication Data
US 2009/0051234 A1 Feb. 26, 2009

(30) Foreign Application Priority Data
Nov. 1, 2005 (JP) .............................. 2005-317925

(51) Int. Cl.
*H02K 3/28* (2006.01)
*H02K 11/00* (2006.01)
*H02K 13/02* (2006.01)

(52) U.S. Cl. ...................... 310/71; 310/68 R; 310/179; 310/180; 310/216.079

(58) Field of Classification Search ................... 310/71, 310/68 R, 132, 140, 144, 179, 180, 184, 198, 310/216.079; H02K 11/00, 13/02
See application file for complete search history.

(56) References Cited

U.S. PATENT DOCUMENTS 6,201,334 B1 * 3/2001 Sargeant et al. ....... 310/216.004

(Continued)

FOREIGN PATENT DOCUMENTS

JP 08-8764 5/1987

(Continued)

OTHER PUBLICATIONS

International Search Report for corresponding International PCT Application No. PCT/JP2006/313729 dated Oct. 17, 2006.

(Continued)

*Primary Examiner*—Quyen Leung
*Assistant Examiner*—Michael Andrews
(74) *Attorney, Agent, or Firm*—RatnerPrestia

(57) ABSTRACT

A motor includes: a rotor in which 10 poles are magnetized at regular intervals; a stator having 12 core pieces and facing the rotor, all core pieces having a concentrated winding wound in the same direction and being annularly arranged; and a wiring board for making 3-phase connection of the windings. A wire connection is made through the wiring board in such a manner that electric currents of adjacent same phase windings flow in opposite directions and of electric currents of adjacent different phase windings flow in same directions.

5 Claims, 6 Drawing Sheets

U.S. PATENT DOCUMENTS

| | | |
|---|---|---|
| 6,998,750 B2 * | 2/2006 | Anma et al. ............... 310/198 |
| 7,408,281 B2 * | 8/2008 | Kinashi ..................... 310/184 |
| 2005/0189828 A1 * | 9/2005 | Nakayama et al. ........... 310/71 |
| 2005/0212372 A1 * | 9/2005 | Akita et al. ................ 310/180 |
| 2005/0253466 A1 * | 11/2005 | Seguchi et al. ............... 310/71 |

FOREIGN PATENT DOCUMENTS

| | | |
|---|---|---|
| JP | 04-501199 | 2/1990 |
| JP | 06-225488 | 8/1994 |
| JP | 10-146030 | 5/1998 |
| JP | 10-146030 A | 5/1998 |
| JP | 10146030 A * | 5/1998 |
| JP | 2000-050603 | 2/2000 |
| JP | 2000-125495 | 4/2000 |
| JP | 2000125495 A * | 4/2000 |
| JP | 2001-119885 | 4/2001 |
| JP | 2001-314056 | 11/2001 |
| JP | 2001-314056 A | 11/2001 |
| JP | 2002-354738 | 12/2002 |

OTHER PUBLICATIONS

English translation of form PCT/ISA/210.

* cited by examiner

US 7,821,165 B2

MOTOR AND METHOD OF MANUFACTURING STATOR USED THEREFOR

This Application is a U.S. National Phase Application of PCT International Application No. PCT/JP2006/313729 filed Jul. 11, 2006.

TECHNICAL FIELD

The present invention relates to a motor and a method of manufacturing a stator used therefor. More particularly, the present invention relates to a motor including a 10-pole-magnetized rotor and a stator having 12 salient poles and windings wound round the salient poles. The present invention also relates to a method of manufacturing a stator used for the motor.

BACKGROUND ART

In order to provide industrial devices with high performance and high function, servo systems to drive the industrial devices have been improved to enhance maintenance properties, response properties, digitalization and accuracy. Furthermore, the servo systems have been downsized and wirings installed in the servo systems have been reduced.

In stators incorporated into the servo motors, space factors of slots of windings have been improved by conducting concentrated winding on division cores round which it is easy to conduct winding work. By adopting rare earth magnets, the rotors are downsized. A technique of using multiple layer printed wiring boards for conducting connection work of the concentrated windings is disclosed, for example, in Japanese Patent Unexamined Publication No. 2000-125495.

In order to further reduce the sizes of the devices and enhance the performance, improve the accuracy and reduce noise generated from the devices, it has been required to further reduce the size, enhance the output, improve the rotational accuracy and reduce the manufacturing cost.

In order to enhance the output and reduce the vibration and noise so as to meet the requirements, a technique to suppress the generation of cogging torque by combining a stator, which is formed out of 12 salient-pole-cores, with 10-pole-magnetized rotor (or 14-pole-magnetized rotor) is disclosed, for example, in Japanese Patent Unexamined Publication No. H8-8764. According to the technique disclosed in this patent publication, it is possible to realize high output, low vibration and low noise by suppressing the generation of cogging torque.

However, it is necessary to arrange 3-phase windings, which are wound by concentrated winding, as follows. It is necessary that a first winding, which is arranged at a position of 180° of the mechanical angle, and a second winding of the same phase are arranged being wound in different directions so that they can be unlike poles from each other. Further, it is necessary that the first winding and a third winding of the same phase, which are adjacent to each other in the circumferential direction, are arranged being wound in different directions so that they can be unlike poles from each other. Further, it is necessary that a winding of a different phase adjacent in the circumferential direction is arranged being wound in the same direction as that of the third winding. As described above, the winding and the processing of connection become complicated.

Problems to be solved are described as follows. The three-phase windings must be arranged in such a manner that a combination, in which the winding directions of the 3-phase windings of the same phase are opposite to each other, is repeated and that the different phase windings adjacent to each other are of the like pole. Accordingly, the winding work becomes very complicated and it is difficult to automatize the winding work. Therefore, a conventional stator manufacturing apparatus can not be used. Therefore, it becomes necessary to make a new investment in equipment or modify a conventional winding apparatus. As a result, the manufacturing cost is raised.

In the case of 3-phase-Y-connection in which the same phase windings are connected only in series, when the concentrated winding is continuously made by using crossover lines without cutting the windings of the same phase, it becomes easy to conduct the connection processing. However, the following problems are caused in the winding work to obtain a high output. That is, it is necessary to employ a thick wire, the diameter of which is large. Accordingly, it is difficult to conduct concentrated wiring while the winding direction is being changed. As a result, a space factor of the slot of the wiring is lowered and the efficiency is deteriorated.

On the other hand, when a thin wire, the diameter of which is small, is employed and the same phase windings are connected to each other by the 3-phase-Y-connection not only in series but also in parallel, it is possible to prevent the space factor of the slot from deteriorating. However, the wire connection work becomes complicated.

DISCLOSURE OF THE INVENTION

The present invention provides a motor including: a rotor in which 10 poles are magnetized at regular intervals; a stator having 12 core pieces and facing the rotor, all core pieces having a concentrated winding wound in the same direction and being annularly arranged; and a wiring board for making 3-phase connection of the windings, 3-phase connection including U-phase, V-phase and W-phase, wherein wire connection is made through the wiring board in such a manner that electric currents of adjacent same phase windings flow in opposite directions and electric currents of adjacent different phase windings flow in the same directions.

Due to the above constitution, it is possible to obtain a highly efficient motor, the output of which is high, in which a space factor of the slot of the winding is high and a cogging torque is low.

The present invention provides a method of manufacturing a stator including: a step of arranging 12 core pieces laterally and conducting concentrated winding continuously in the same winding direction with respect to all of the core pieces; a step of arranging the 12 core pieces having the windings annularly; a step of cutting off crossover lines connecting the core pieces when the windings are continuously wound; and a step of connecting end portions of the windings, which are made by the cutting of the crossover lines, to each other by 3-phase-connection through the wiring board in such a manner that electric currents of adjacent same phase windings flow in opposite directions and electric currents of adjacent different phase windings flow in the same directions.

By combining the stator manufactured by this method with 10-pole-magnetized rotor, it is possible to obtain a highly efficient motor, the output of which is high, in which a space factor of the slot of the winding is high and a cogging torque is low.

DESCRIPTION OF REFERENCE NUMERALS AND SIGNS

Figure 1:
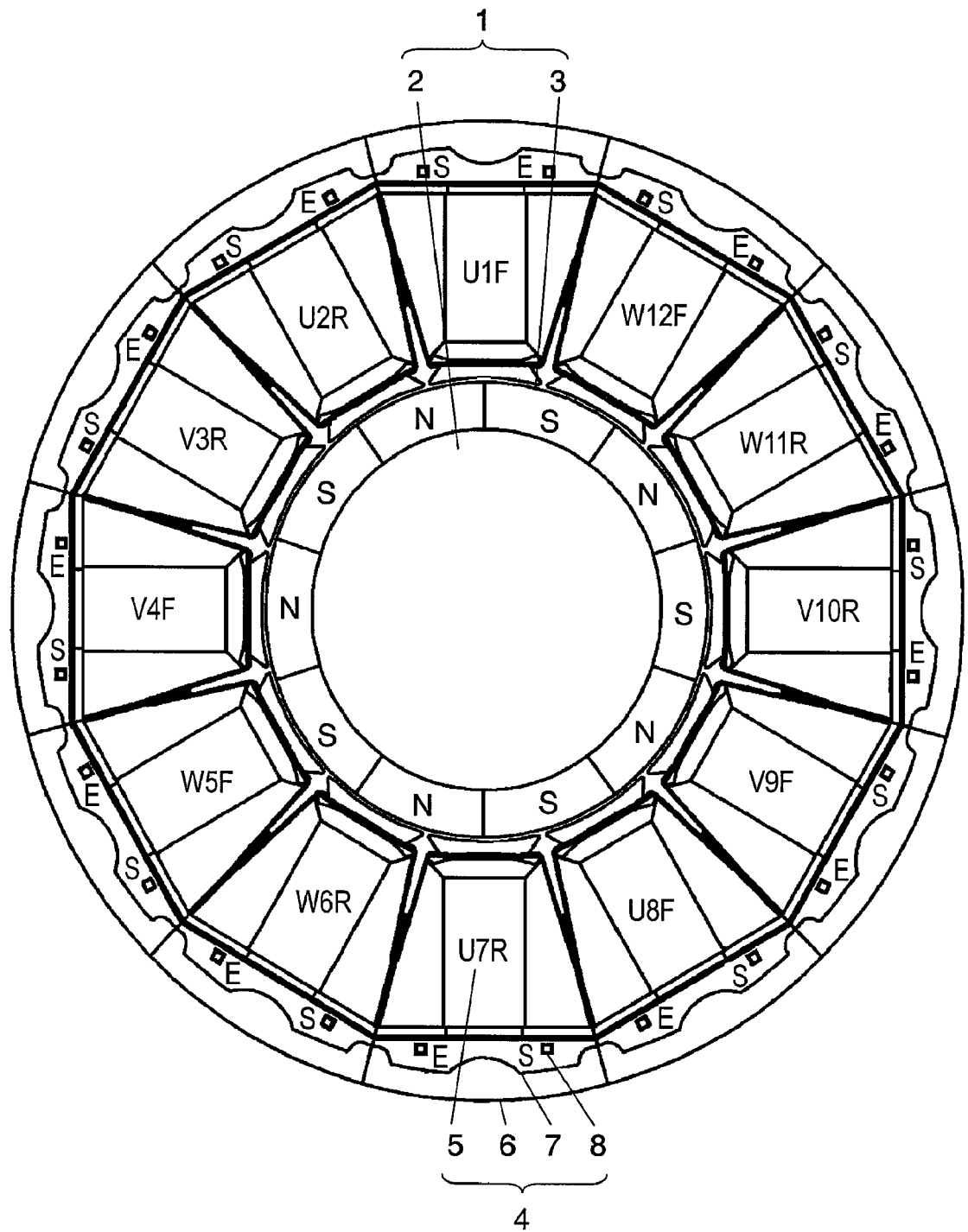
FIG. 1 is a schematic illustration of an essential part of a motor in an embodiment of the present invention.

1 Rotor
2 Iron core of rotor
3 Magnet
4 Stator
5 Concentrated winding
6 Core piece
7 Insulating plate
8 Terminal pin
91 Multiple layer printed wiring board (first layer)
92 Multiple layer printed wiring board (second layer)
93 Multiple layer printed wiring board (third layer)
94 Multiple layer printed wiring board (fourth layer)

PREFERRED EMBODIMENTS FOR CARRYING OUT THE INVENTION

Figure 3:
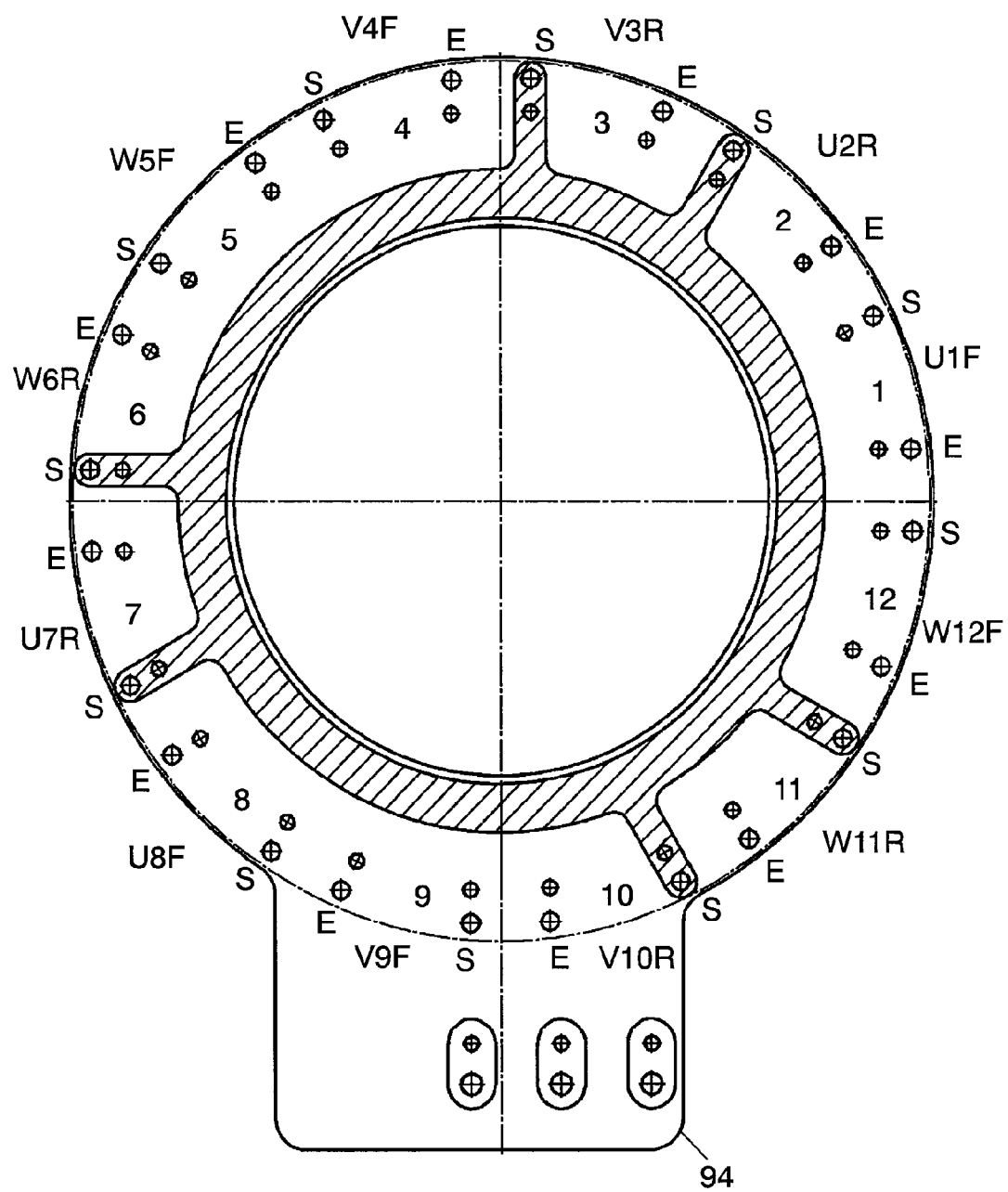
FIG. 3 is a pattern diagram of neutral points (fourth layer) at a multiple layer printed wiring board of the motor shown in FIG. 1.
Figure 4:
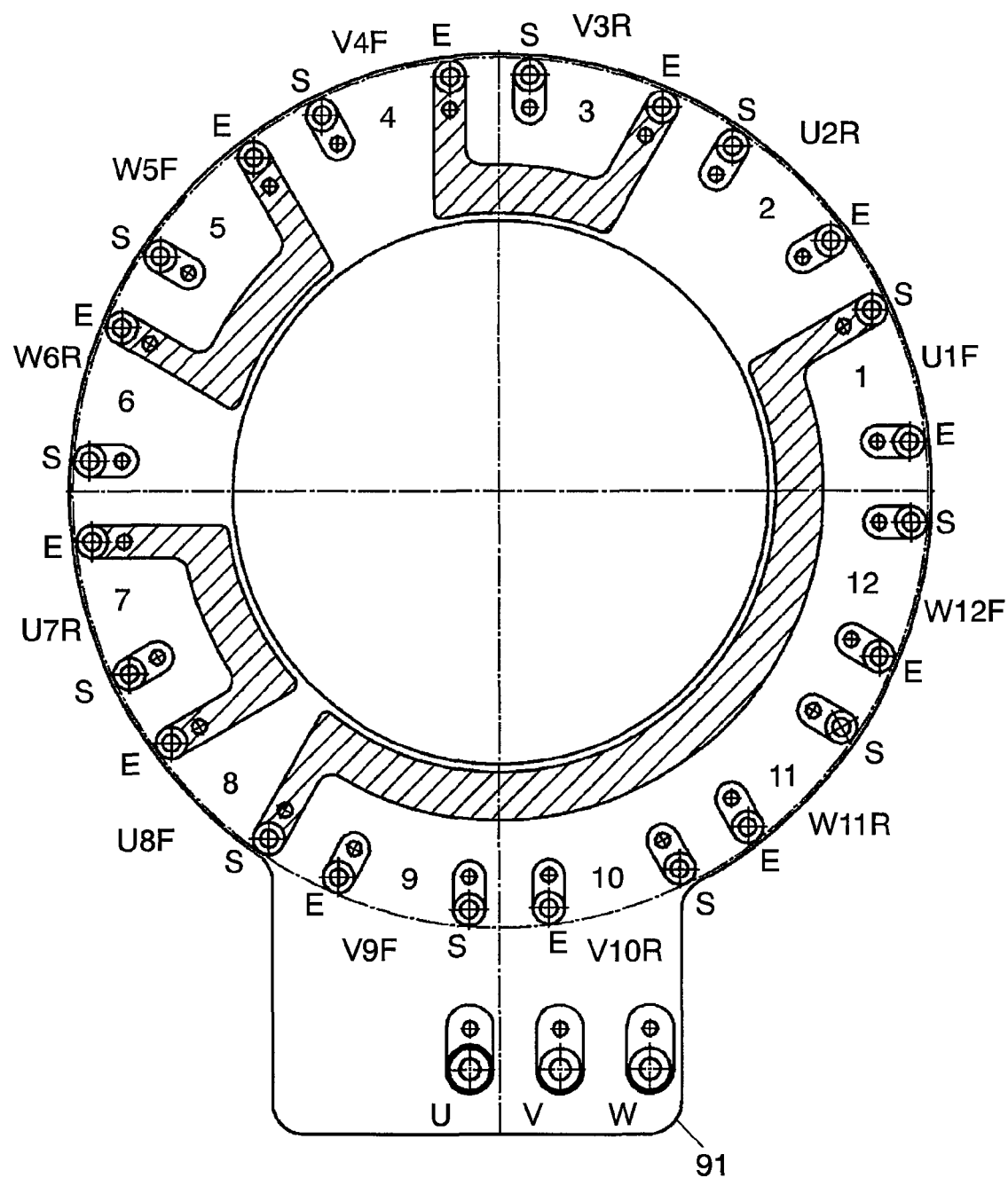
FIG. 4 is a pattern diagram of the first layer at the multiple layer printed wiring board of the motor shown in FIG. 1.
Figure 5:
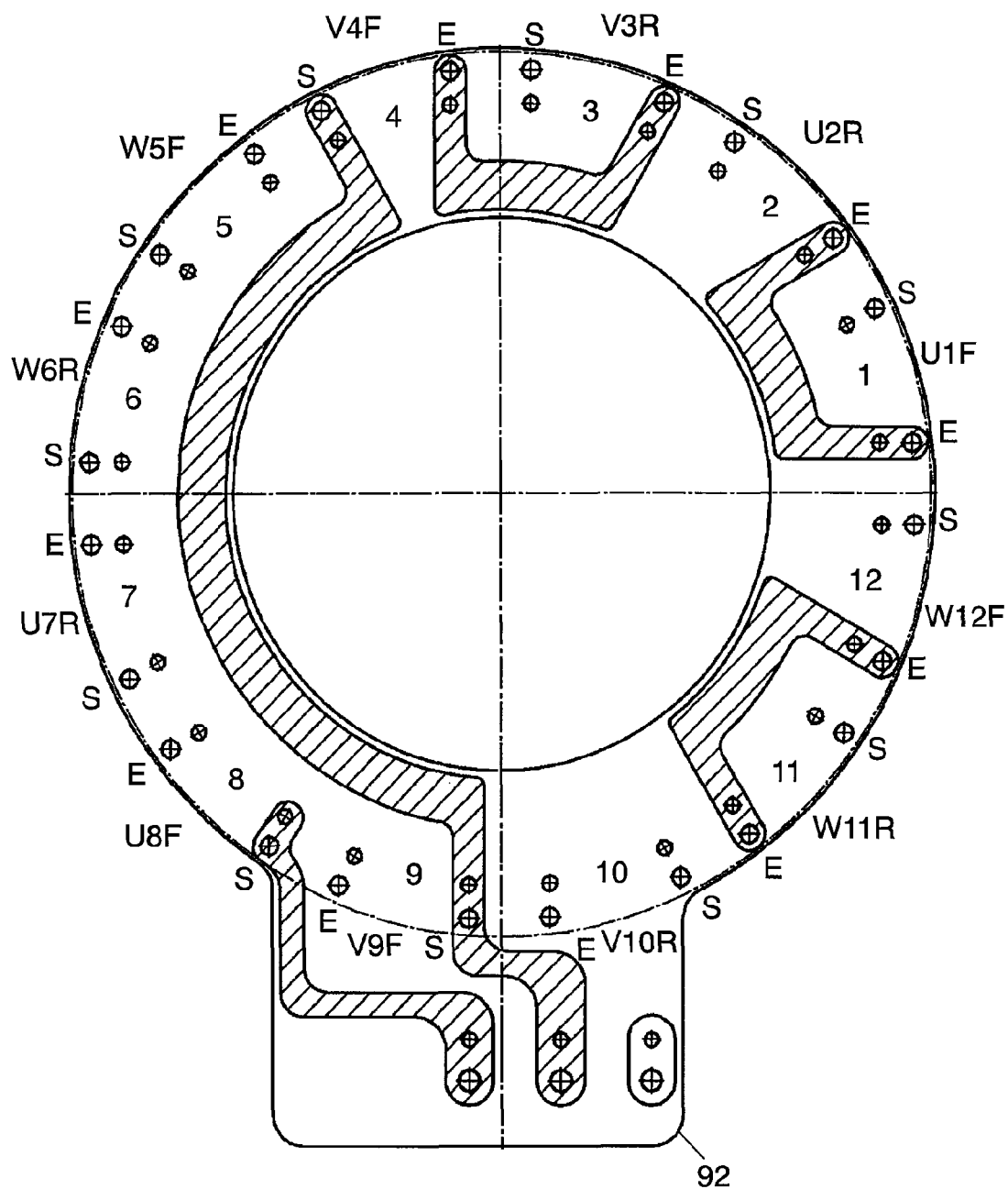
FIG. 5 is a pattern diagram of the second layer at the multiple layer printed wiring board of the motor shown in FIG. 1.
Figure 6:
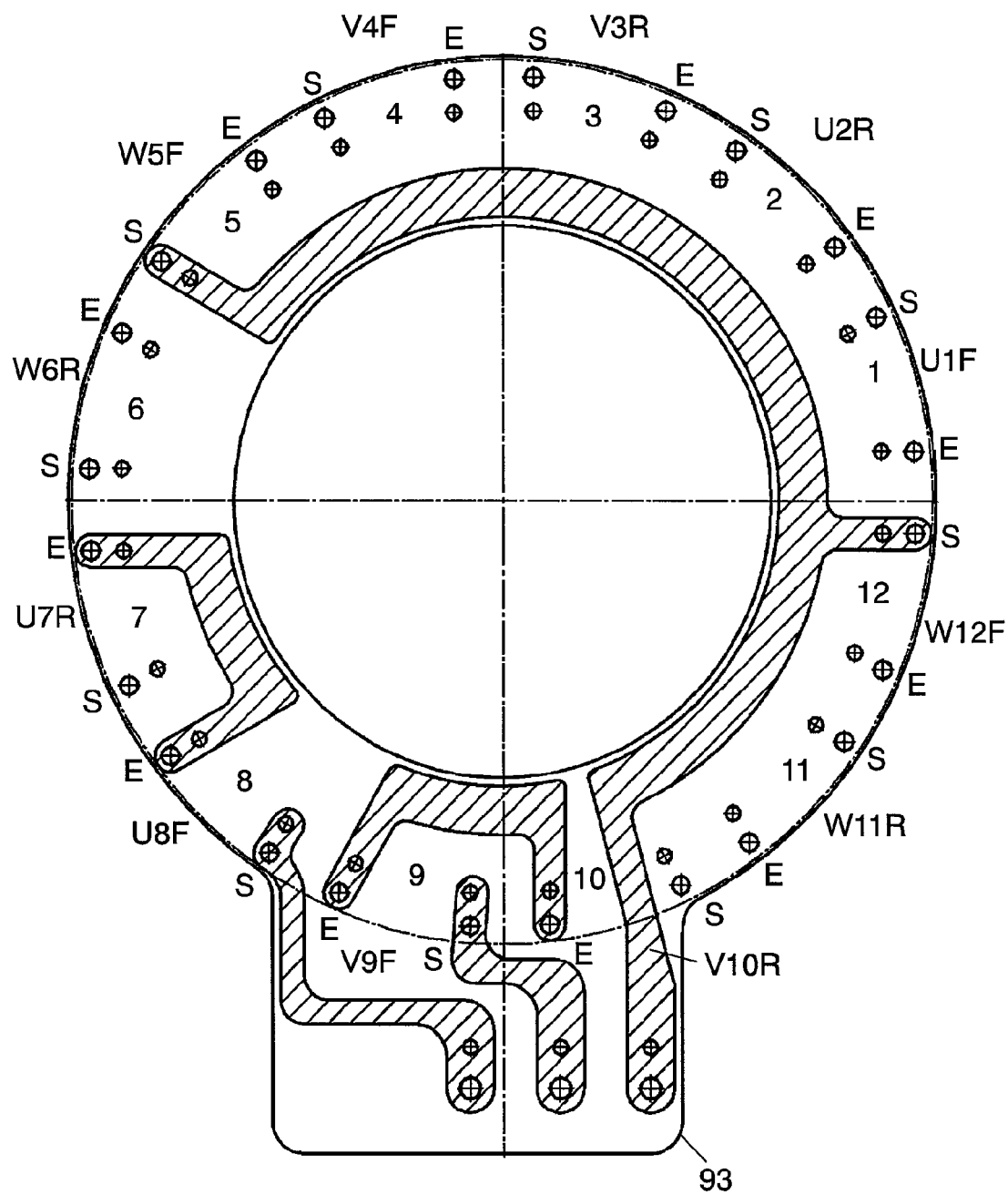
FIG. 6 is a pattern diagram of the third layer at the multiple layer printed wiring board of the motor shown in FIG. 1.

Referring to the drawings, an embodiment of the present invention will be explained below. FIG. 1 is a schematic illustration of an essential part of a motor in an embodiment of the present invention, FIG. 2 is a wire connection diagram of 3-phase windings in a stator of a motor shown in FIG. 1, FIG. 3 is a pattern diagram of neutral points (fourth layer) at a multiple layer printed wiring board of the motor shown in FIG. 1, FIG. 4 is a pattern diagram of the first layer at the multiple layer printed wiring board of the motor shown in FIG. 1, FIG. 5 is a pattern diagram of the second layer at the multiple layer printed wiring board of the motor shown in FIG. 1, and FIG. 6 is a pattern diagram of the third layer at the multiple layer printed wiring board of the motor shown in FIG. 1.

In FIGS. 1 to 6, the motor of the present embodiment includes: rotor 1; stator 4; and multiple printed wiring boards 91, 92, 93 and 94. In rotor 1, 10 poles are magnetized at regular intervals (In this case, one pair is formed out of N-pole and S-pole. Therefore, 10 poles include 5 pairs of poles.). Stator 4 includes 12 core pieces 6. All core pieces 6 have concentrated windings 5, which are wound in the same direction, and arranged annularly. Stator 4 is arranged facing rotor 1 through a gap. Concentrated wirings 5, which are wound round 12 core pieces 6 through multiple layer printed wiring boards 91, 92, 93 and 94, are connected to each other by 3-phase connection including U-phase, V-phase and W-phase. In this case, the adjacent same phase windings are connected to each other through multiple layer printed wiring boards 91, 92, 93 and 94 in such a manner that the electric currents flow in opposite directions. The adjacent different phase windings are connected to each other through multiple layer printed wiring boards 91, 92, 93 and 94 in such a manner that the electric currents flow in the same directions.

Figure 2:
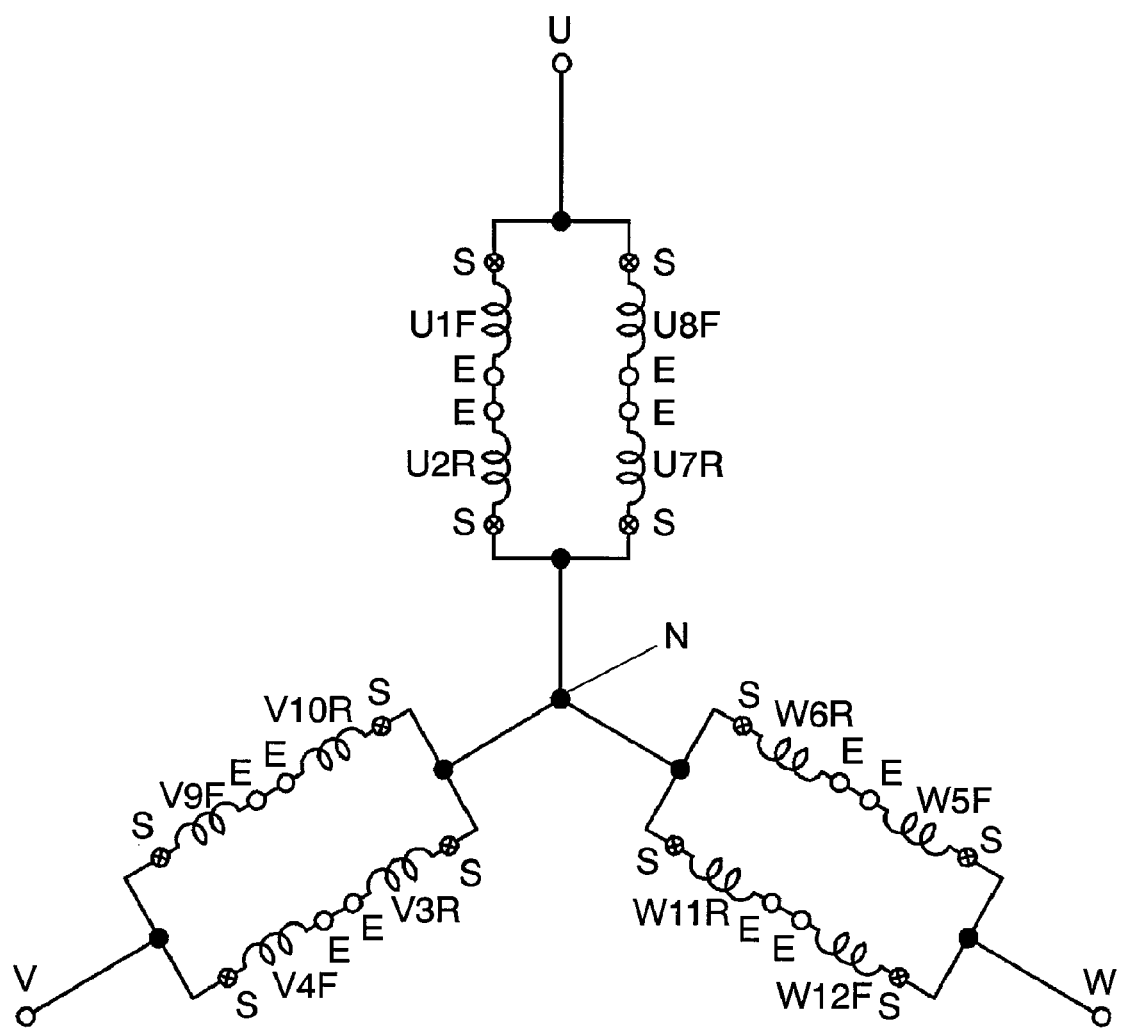
FIG. 2 is a wire connection diagram of 3-phase windings in a stator of the motor shown in FIG. 1.

As shown in FIG. 2, the motor of the embodiment shown in FIG. 1 is composed in such a manner that 3 groups of wirings are connected to each other by 3-phase-Y-connection. In this case, each group of wirings of one phase is composed by connecting two circuits in parallel with each other, wherein each circuit is composed when the same phase windings adjacent to each other are connected in series to each other.

A method of manufacturing stator 4 of the embodiment of the present invention includes the following steps.

The method of manufacturing a stator includes: a step of arranging 12 core pieces 6 laterally and conducting concentrated winding continuously in the same winding direction with respect to all of core pieces 6; a step of arranging 12 core pieces 6 having the windings annularly; a step of cutting off crossover lines connecting the core pieces when the windings are continuously wound; and a step of connecting end portions of the windings, which are made by the cutting of the crossover lines, to each other by 3-phase-connection through multiple layer printed wiring boards 91, 92, 93 and 94 in such a manner that electric currents of adjacent same phase windings flow in opposite directions and electric currents of the adjacent different phase windings flow in the same directions.

The motor of the embodiment of the present invention will be explained in more detail. In FIG. 1, rotor 1 includes: rotor iron core 2; and magnet 3. Magnet 3 is fixed onto an outer wall of rotor iron core 2 by adhesive. In magnet 3, 10 poles are magnetized in such a manner that N-poles and S-poles are alternately arranged in the radial direction. Stator 4 is composed in such a manner that 12 core pieces are annularly arranged and connected with each other by 3-phase-Y-connection on a multiple layer printed wiring board described later. Rotor 1 is arranged inside stator 4 while a gap is being formed between rotor 1 and stator 4. In this way, the motor of the embodiment of the present invention is composed.

In this case, core piece 6 will be explained below in more detail. Core piece 6 is composed as follows. A predetermined number of iron cores, which are divided by the teeth unit, are laminated on each other. Then, both end portions of the laminated iron cores are subjected to insulation treatment by insulating plates 7. After that, a starting point of winding and an ending point of winding of concentrated winding 5, which is wound in the same direction, are respectively soldered to terminal pin 8. For example, the starting point of winding, which is expressed by mark S in FIG. 1, is connected to one of the terminal pins. The ending point of winding, which is expressed by mark E in FIG. 1, is connected to the other of the terminal pins. Both terminal pins 8 may be provided on a side of insulating plate 7 on which a connection of wiring is made. When 12 core pieces 6, round which concentrated wirings 5 are wound in the same direction, are annularly arranged and division faces of respective core pieces 6 are joined and fixed to each other.

Core pieces 6 having concentrated wirings 5 shown in FIG. 1 are in a state in which concentrated wirings 5, which are concentrated and wound in the same direction, are only connected to terminal pins 8, that is, in a state before the 3-phase connection of wirings. Accordingly, 12 phase arrangements and a direction of an electric current have not been decided yet.

In this case, in order to make a positional relation of the windings with a circuit diagram and also a positional relation of the windings with the multiple printed layer described later clear, 12 core pieces 6 are distinguished by the phases of U, V and W. Further, 12 core pieces 6 are attached with wiring numbers from 1 to 12 in a counterclockwise direction. Further, a difference of the direction of the phase electric current is distinguished by attaching mark "F" or "R" at the rear of the winding number. For example, U1F and U8F express that the excitation is made so that the poles can be like. U2R and U7R express that the excitation is made so that the poles can be unlike with respect to U1F and U8F. V4F and V9F express that the excitation is made so that the poles can be like. V3R and V10R express that the excitation is made so that the poles can be unlike with respect to V4F and V9F. W5F and W12F express that the excitation is made so that the poles can be like. W6R and W11R express that the excitation is made so that the poles can be unlike with respect to W5F and W12F.

In FIG. 1, the expression is made in such a manner that the first U phase is U1F and the second U phase is U2R. After that, the expression is made in such a manner that the third V phase is V3R, the fourth V phase is V4F, the fifth W phase is W5F, the sixth W phase is W6R, the seventh U phase is U7R, the eighth U phase is U8F, the ninth V phase is V9F, the tenth V phase is V10R, the eleventh W phase is W11R and the twelfth W phase is E12F in a counterclockwise direction. Due to the foregoing, directions of the electric currents of the same phase windings, which are adjacent to each other, are made to be opposite to each other and directions of the electric currents of the different phase windings, which are adjacent to each other, are made to be equal to each other.

Next, referring to FIG. 2, the 3-phase-Y-connection will be explained below. As shown in FIG. 2, 3 groups of wirings are connected to each other by 3-phase-Y-connection. In this case, each group of wirings of one phase is composed by connecting two circuits in parallel with each other, wherein each circuit is composed when the same phase windings adjacent to each other are connected in series to each other. That is, when a series circuit of U phase windings U1F and U2R, which are adjacent to each other, and a series circuit of U phase windings U7R and U8F, which are adjacent to each other, are connected in parallel with each other, the entire U phase winding is composed. When a series circuit of V phase windings V3R and V4F, which are adjacent to each other, and a series circuit of V phase windings V9F and V10R, which are adjacent to each other, are connected in parallel with each other, the entire V phase winding is composed. When a series circuit of W phase windings W5F and W6R, which are adjacent to each other, and a series circuit of W phase windings W11R and W12F, which are adjacent to each other, are connected in parallel with each other, the entire W phase winding is composed.

The entire U phase winding, the entire V phase winding and the entire W phase winding are connected to each other by the 3-phase-Y-connection. This connection is suitable for obtaining a high output by winding a thin wire, the diameter of which is small.

Although a repetition is made here, objective windings, in which the same phase windings adjacent to each other are connected in series, are 6 circuits including U1F and U2R, V3R and V4F, W5F and W6R, U7R and U8F, V9F and V10R, W11R and W12F. FIG. 2 shows a state in which series circuits of the same phase in the above 6 circuits are connected in parallel with each other. In this connection, a starting point of each winding is attached with mark "S" and an ending point of each winding is attached with mark "E". A neutral point of the 3-phase-Y-connection is attached with mark "N".

Next, a multiple layer (four layers) printed wiring board, where the 3-phase-Y-connection in FIG. 2 is to be formed, is demonstrated with reference to FIGS. 3 to 6.

FIG. 3 is a view showing an example of the neutral point layout (the fourth layer). A neutral point pattern (a hatched portion) is formed on printed wiring board 94. Each winding number, starting point S of each winding and ending point E of each winding are shown in the view. Starting point S of winding U2R, starting point S of winding U7R, starting point S of winding V3R, starting point S of winding V10R, starting point S of winding W6R and starting point S of winding W11R are respectively connected to the neutral point pattern. In this way, neutral point N of the 3-phase-Y-connection shown in FIG. 2 is connected.

FIG. 4 is a view showing a pattern layout of the first layer on the multiple layer printed wiring board. A first layer wiring pattern (a hatched portion) is formed on printed wiring board 91. Each winding number, starting point S of each winding and ending point E of each winding are shown in the view. As shown in FIG. 1, 24 terminal pins 8 penetrate portions in the outer peripheries of the first layer to the fourth layer of the multiple layer printed wiring board. On the first layer of the multiple layer printed wiring board, each terminal pin 8 and starting point S or ending point E of each winding are electrically connected to each other through a land. Ending point E of winding U7R and ending point E of winding U8F are connected to each other through a wiring pattern. Ending point E of winding V3R and ending point E of winding V4F are connected to each other through a wiring pattern. Ending point E of winding W5F and ending point E of winding W6R are connected to each other through a wiring pattern. Staring point S of wiring U1F and starting point S of wiring U8F are connected to each other through a wiring pattern.

FIG. 5 is a view showing a pattern layout of the second layer on the multiple layer printed wiring board. A second layer wiring pattern (a hatched portion) is formed on printed wiring board 92. Each winding number, starting point S of each winding and ending point E of each winding are shown in the view. Ending point E of winding U1F and ending point E of winding U2R are connected to each other through a wiring pattern. Ending point E of winding V3R and ending point E of winding V4F are connected to each other through a wiring pattern. Ending point E of winding W11R and ending point E of winding W12F are connected to each other through a wiring pattern. Starting point S of winding V4F and starting point S of winding V9F are connected to each other through a wiring pattern.

FIG. 6 is a view showing a pattern layout of the third layer on the multiple layer printed wiring board. A third layer wiring pattern (a hatched portion) is formed on printed wiring board 93. Each winding number, starting point S of each winding and ending point E of each winding are shown in the view. Ending point E of winding U7R and ending point E of winding U8F are connected to each other through a wiring pattern. Ending point E of winding V9F and ending point E of winding V10R are connected to each other through a wiring pattern. Starting point S of winding W5F and starting point S of winding W12F are connected to each other through a wiring pattern.

Each pattern shown in FIGS. 3 to 6 is connected to winding of the same phase of U, V, W through a through hole and led out from a circular portion on each printed wiring board to a land of each phase provided in a square portion.

Pins 8 described above are soldered to multiple layer printed wiring boards 91 to 94. In this way, the 3-phase-Y-connection is completed.

In the above embodiment, a printed wiring board is used as the wiring board. However, it should be noted that the wiring board is not limited to the printed wiring board. For example, the wiring board may be composed in such a manner that the same copper plates are punched out and the connection is made while the layers are being insulated from each other. Alternatively, the wiring board may be composed in such a manner that the same copper plates are arranged on concentric circles and the connection is made while the concentric circles are being insulated from each other.

In the above embodiment, a concentrated wiring is individually made for a core piece of the teeth unit which has been divided into 12 pieces. However, it should be noted that the present embodiment is not limited to the above specific embodiment. Even in the case where core pieces of the teeth unit are laterally connected to each other, when a concentrated wiring is made for each core piece in the same winding direction so as to ensure the state shown in FIG. 1, it is possible to execute the invention in the same way.

For example, 12 core pieces, which are provided with terminal pins in the same manner as that of the present embodiment, are arranged in the lateral direction and a concentrated wiring is made in the same winding direction while being connected with the terminal pins. Without cutting off the crossover lines, winding is continuously made. After 12 windings have been completed, the core pieces are annularly fixed. Then, the crossover lines provided between the core pieces may be cut off. Even when shapes of 12 core pieces are different from each other, it is easy to return the shape into an annular shape. Under the condition that 12 core pieces are laterally developed, concentrated winding may be made at the same time in the same direction for 3 core pieces of 3 phases. Further, the same concentrated winding may be repeated while skipping three core pieces.

As described above, the stator for 12 salient poles to be combined with 10-pole-rotor is connected by the 3-phase-Y-connection by using the wiring board. Therefore, it is possible to conduct concentrated wiring in the same direction with respect to all wirings. Therefore, it is possible to make an alignment winding with a conventional wiring apparatus. Accordingly, a wiring end can be lowered. Therefore, it is possible to obtain a highly efficient small motor, the space factor of the slot of the winding of which is high.

Core pieces of the same phase contributing to a generation of torque can be arranged at an interval of 180° of the mechanical angle while the balance is being kept. Accordingly, cogging torque can be reduced. Further, vibration and noise can be reduced.

In the above embodiment, a 10-pole-magnetized surface permanent magnetic (SPM) rotor is described as the motor. However, even when a 10-pole-magnetized interior permanent magnetic (IPM) rotor is used as the motor, the invention can be executed in the same manner.

As described above, according to the motor of the present invention, the 3-phase-Y-connection is made by the wiring board. Accordingly, 12 core pieces can be subjected to concentrated wiring in the same direction. Therefore, an alignment winding can be easily conducted. Therefore, the coil end can be lowered. Further, it is possible to use the same parts as those of the conventional stator. Furthermore, it is possible to use the conventional manufacturing apparatus. Accordingly, it is possible to obtain an inexpensive motor.

In addition to that, the embodiment of the invention adopts the 3-phase-Y-connection in which 2 circuits are connected in parallel with each other wherein each circuit includes the same phase windings which are adjacent to each other. Therefore, this embodiment can comply with a case in which the output is highly raised.

Further, steps before the wiring board for the 3-phase-Y-connection is attached may be the same as the conventional steps. Therefore, only when wiring boards, the wiring patterns of which are different, are combined with each other, for example, a stator used for 8-pole-magnetized rotor can be changed to a stator used for 10-pole-magnetized rotor or 14-pole-magnetized rotor.

Since the parts for the stator and the manufacturing apparatus can be used as described above, the manufacturing cost can be reduced. When the stator is combined with 10-pole-magnetized rotor or 14-pole-magnetized rotor, it is possible to provide a highly efficient motor of a large capacity, the cogging torque of which is reduced.

INDUSTRIAL APPLICABILITY

The motor of the present invention can be suitably used for a servo motor, the performance of which is desired to be high. Further, the motor of the present invention is also useful for a device which is delicate in vibration and noise.

The invention claim is:

1. A motor comprising:
   a rotor in which 10 poles are magnetized at regular intervals;
   a stator having 12 core pieces and facing the rotor, all core pieces having a concentrated winding wound in a same winding direction and being annularly arranged; and
   a wiring board for making 3-phase connection of the windings, wherein
   a wire connection is made through the wiring board in such a manner that electric currents of adjacent same phase windings flow in opposite directions and electric currents of adjacent different phase windings flow in same directions.

2. The motor of claim 1, wherein two circuits, in which the adjacent same phase windings are connected in series, are connected in parallel with each other, and
   the 3-phase connection is made by Y-connection.

3. The motor of claim 1, wherein the wiring board is a multiple layer printed wiring board, and
   the wire connection is made through a multiple layer wiring pattern at the multiple layer printed wiring board.

4. The motor of claim 2, wherein the wiring board is a multiple layer printed wiring board, and
   the Y-connection is made through a multiple layer wiring pattern at the multiple layer printed wiring board.

5. A method of manufacturing a stator comprising:
   a step of arranging 12 core pieces laterally and conducting concentrated winding continuously in a same winding direction with respect to all of the core pieces;
   a step of arranging the 12 core pieces having the windings annularly;
   a step of cutting off crossover lines connecting all of the core pieces when the windings are continuously wound; and
   a step of connecting end portions of the windings, which are made by the cutting of the crossover lines, to each other by 3-phase-connection through the wiring board in such a manner that electric currents of adjacent same phase windings flow in opposite directions and electric currents of adjacent different phase windings flow in same directions.

* * * * *

UNITED STATES PATENT AND TRADEMARK OFFICE
CERTIFICATE OF CORRECTION

| | | |
|---|---|---|
| PATENT NO. | : 7,821,165 B2 | Page 1 of 1 |
| APPLICATION NO. | : 11/573988 | |
| DATED | : October 26, 2010 | |
| INVENTOR(S) | : Yamane et al. | |

It is certified that error appears in the above-identified patent and that said Letters Patent is hereby corrected as shown below:

In column 8, line 22 of the Letters Patent, in claim 1, "a stator having 12 core pieces and facing the rotor all core pieces having a concentrated winding wound in a same winding direction and being annularly arranged; and" should read --a stator having windings and facing the rotor; and--.

In column 8, line 25 of the Letters Patent, in claim 1, insert the following paragraph after "a wiring board for making 3-phase connection of the windings, wherein," --the stator is configured by arranging 12 divided core pieces annularly and joining division faces of respective core pieces, in which all core pieces have a concentrated winding wound in a same winding direction, and--.

In column 8, line 45 of the Letters Patent, in claim 5, "arranging 12 core" should read --arranging 12 divided core--.

In column 8, line 46 of the Letters Patent, in claim 5, "winding continuously" should read --winding sequentially and continuously--.

In column 8, line 48 of the Letters Patent, in claim 5, "a step of arranging the 12 core pieces having the windings annularly;" should read --a step of arranging the 12 divided core pieces having the windings annularly and joining division faces of respective core pieces;--.

Signed and Sealed this
Fifteenth Day of March, 2011

David J. Kappos
*Director of the United States Patent and Trademark Office*